United States Patent
Quach et al.

(10) Patent No.: US 10,386,067 B2
(45) Date of Patent: Aug. 20, 2019

(54) WALL PANEL ASSEMBLY FOR A GAS TURBINE ENGINE

(71) Applicant: United Technologies Corporation, Farmington, CT (US)

(72) Inventors: San Quach, Southington, CT (US); Scott A. Elliott, Rock Hill, NY (US); Robert M. Sonntag, Bolton, CT (US); John S. Tu, West Hartford, CT (US); Anthony Van, Palm City, FL (US); Joseph J. Sedor, Oxford, MA (US); Robert Selinsky, Jr., Moodus, CT (US); John J. Rup, Jr., Willington, CT (US); Neil B. Ridgeway, South Windsor, CT (US); Gerard V. Cadieux, Manchester, CT (US); Jeffrey Leon, Glastonbury, CT (US); Monica Pacheco-Tougas, Waltham, MA (US); Lisa A. Jenkins, Tolland, CT (US); Lisa Tse, Wallkill, NY (US); Andrew Cervoni, Staatsburg, NY (US); Frank J. Trzcinski, Milford, PA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 271 days.

(21) Appl. No.: 15/266,036

(22) Filed: Sep. 15, 2016

(65) Prior Publication Data
US 2018/0073737 A1   Mar. 15, 2018

(51) Int. Cl.
*F23R 3/00*   (2006.01)
*F23R 3/06*   (2006.01)
(Continued)

(52) U.S. Cl.
CPC ............... *F23R 3/002* (2013.01); *F02C 7/12* (2013.01); *F23R 3/06* (2013.01); *F23R 3/44* (2013.01);
(Continued)

(58) Field of Classification Search
CPC .. F05D 2240/35; F05D 2300/611; F23R 3/60; F23R 3/06; F23R 3/002; F23R 3/44; F23R 3/50; F02C 7/12
See application file for complete search history.

(56) References Cited

U.S. PATENT DOCUMENTS 5,528,904 A * 6/1996 Jones ................ F01D 5/288
                                                      60/753
5,630,314 A * 5/1997 Kojima .................. C23C 4/02
                                                      416/241 B
(Continued)

FOREIGN PATENT DOCUMENTS

WO    2015047472 A2    4/2015

OTHER PUBLICATIONS

European Search Report for EP Application No. 17191190.2 dated Mar. 22, 2018; 8 pages.

*Primary Examiner* — Todd E Manahan
*Assistant Examiner* — Eric W Linderman
(74) *Attorney, Agent, or Firm* — Cantor Colburn LLP

(57) ABSTRACT

A wall panel assembly includes a first liner panel and a coating. The first liner panel has an inner first liner panel surface and a first liner panel outer surface each axially extending between a first liner panel first end and a first liner panel second end. The coating is disposed on at least one of the first liner panel inner surface and the first liner panel outer surface. The coating has an overall thickness that varies axially between the first liner panel first end and the first liner panel second end.

12 Claims, 5 Drawing Sheets

(51) Int. Cl.
*F02C 7/12* (2006.01)
*F23R 3/44* (2006.01)
*F23R 3/50* (2006.01)

(52) U.S. Cl.
CPC ............ *F23R 3/50* (2013.01); *F05D 2220/32* (2013.01); *F05D 2240/35* (2013.01); *F05D 2300/611* (2013.01); *F23R 2900/00005* (2013.01); *F23R 2900/03045* (2013.01)

(56) References Cited

U.S. PATENT DOCUMENTS

| | | | | |
|---|---|---|---|---|
| 5,817,372 | A * | 10/1998 | Zheng | C23C 4/02 427/456 |
| 6,096,381 | A * | 8/2000 | Zheng | C23C 4/02 427/454 |
| 6,136,453 | A * | 10/2000 | Ritter | C23C 4/02 427/456 |
| 6,207,295 | B1 * | 3/2001 | Stowell | C23C 28/3215 428/615 |
| 6,408,628 | B1 * | 6/2002 | Pidcock | F23R 3/002 60/752 |
| 6,438,958 | B1 * | 8/2002 | McCaffrey | F23R 3/002 60/752 |
| 7,479,328 | B2 * | 1/2009 | Roth-Fagaraseanu | C23C 28/042 428/632 |
| 7,919,151 | B2 * | 4/2011 | Deng | B05D 1/60 427/203 |
| 2001/0017034 | A1 * | 8/2001 | Spooner | F23R 3/002 60/752 |
| 2002/0102360 | A1 * | 8/2002 | Subramanian | C23C 24/04 427/419.1 |
| 2002/0124572 | A1 * | 9/2002 | Pidcock | F23R 3/002 60/796 |
| 2003/0145604 | A1 * | 8/2003 | Pidcock | F23R 3/002 60/796 |
| 2004/0123598 | A1 * | 7/2004 | Ackermann | F23M 5/00 60/752 |
| 2004/0126229 | A1 * | 7/2004 | Ackermann | F23M 5/00 415/200 |
| 2004/0131877 | A1 * | 7/2004 | Hasz | B32B 15/01 428/614 |
| 2004/0166355 | A1 * | 8/2004 | Lee | C23C 4/02 428/553 |
| 2004/0258946 | A1 * | 12/2004 | Allen | C23C 28/321 428/622 |
| 2005/0034399 | A1 * | 2/2005 | Pidcock | F23R 3/002 52/506.1 |
| 2005/0050896 | A1 * | 3/2005 | McMasters | F23M 5/085 60/748 |
| 2005/0086940 | A1 * | 4/2005 | Coughlan, III | F23R 3/002 60/752 |
| 2005/0282020 | A1 * | 12/2005 | Stowell | C23C 24/08 428/446 |
| 2006/0016191 | A1 * | 1/2006 | Woodcock | C23C 4/18 60/754 |
| 2006/0083937 | A1 * | 4/2006 | Burd | F01D 5/288 428/457 |
| 2007/0036997 | A1 * | 2/2007 | Floyd | C04B 35/486 428/472 |
| 2007/0193216 | A1 * | 8/2007 | Woolford | F23R 3/002 52/782.1 |
| 2007/0207328 | A1 * | 9/2007 | Frost | C23C 4/02 428/469 |
| 2008/0085395 | A1 * | 4/2008 | Fernihough | B23P 6/007 428/131 |
| 2008/0134683 | A1 * | 6/2008 | Foale | F23R 3/002 60/755 |
| 2008/0145211 | A1 * | 6/2008 | Foale | F01D 25/12 415/178 |
| 2008/0292859 | A1 * | 11/2008 | Subramanian | C04B 35/486 428/220 |
| 2009/0142548 | A1 * | 6/2009 | Patterson | C23C 4/02 428/137 |
| 2010/0011775 | A1 * | 1/2010 | Garry | C23C 4/02 60/752 |
| 2010/0015401 | A1 * | 1/2010 | Bolz | C23C 14/083 428/172 |
| 2010/0071382 | A1 * | 3/2010 | Liang | F01D 9/023 60/806 |
| 2010/0095678 | A1 * | 4/2010 | Hawie | F01D 9/023 60/752 |
| 2010/0162715 | A1 * | 7/2010 | Nagaraj | C23C 4/08 60/752 |
| 2011/0038710 | A1 * | 2/2011 | Kemppainen | F01D 5/288 415/115 |
| 2011/0151219 | A1 * | 6/2011 | Nagaraj | F23R 3/007 428/215 |
| 2012/0034471 | A1 * | 2/2012 | Peterson | C23C 4/02 428/457 |
| 2012/0102959 | A1 * | 5/2012 | Starkweather | F23R 3/04 60/752 |
| 2012/0255308 | A1 * | 10/2012 | Chandler | F23R 3/002 60/754 |
| 2013/0014510 | A1 * | 1/2013 | Pater | F01D 5/18 60/752 |
| 2013/0031904 | A1 * | 2/2013 | Garry | F23R 3/002 60/722 |
| 2013/0047618 | A1 * | 2/2013 | Gregory | F23R 3/002 60/722 |
| 2013/0055722 | A1 * | 3/2013 | Verhiel | F23R 3/007 60/772 |
| 2013/0091847 | A1 * | 4/2013 | Chen | F23R 3/002 60/752 |
| 2013/0209232 | A1 * | 8/2013 | Xu | B24C 1/045 415/116 |
| 2013/0255269 | A1 * | 10/2013 | McKenzie | F23R 3/007 60/772 |
| 2013/0269354 | A1 * | 10/2013 | Starkweather | F23R 3/06 60/754 |
| 2014/0086810 | A1 * | 3/2014 | Everhart | B01D 53/88 423/210 |
| 2014/0147251 | A1 * | 5/2014 | Reinert | F23R 3/002 415/119 |
| 2014/0161585 | A1 * | 6/2014 | Arness | F01D 5/186 415/1 |
| 2014/0250894 | A1 * | 9/2014 | Petty, Sr. | F23R 3/60 60/754 |
| 2014/0290258 | A1 * | 10/2014 | Gerendas | F23R 3/002 60/754 |
| 2014/0360196 | A1 * | 12/2014 | Graves | F23R 3/002 60/753 |
| 2015/0300645 | A1 * | 10/2015 | Jopp | F23R 3/002 60/753 |
| 2015/0377069 | A1 * | 12/2015 | Landwehr | F01D 25/28 415/1 |
| 2016/0097285 | A1 * | 4/2016 | Harding | F01D 5/186 60/752 |
| 2016/0097325 | A1 * | 4/2016 | Harding | F01D 5/186 60/752 |
| 2016/0109128 | A1 * | 4/2016 | Drake | F23R 3/002 60/782 |
| 2016/0195272 | A1 * | 7/2016 | Tu | F23R 3/002 428/633 |
| 2016/0209033 | A1 * | 7/2016 | Burd | F23R 3/002 |
| 2016/0252250 | A1 * | 9/2016 | Bunker | F23R 3/007 60/753 |
| 2016/0265367 | A1 * | 9/2016 | Rosenzweig | C04B 41/89 |
| 2016/0273391 | A1 * | 9/2016 | Burd | F01D 25/30 |
| 2016/0298467 | A1 * | 10/2016 | Ucasz | C23C 14/083 |
| 2017/0009987 | A1 * | 1/2017 | McKinney | F23R 3/002 |
| 2017/0081753 | A1 * | 3/2017 | Zhang | C23C 4/134 |
| 2017/0107833 | A1 * | 4/2017 | Brewer | F01D 9/023 |
| 2017/0108219 | A1 * | 4/2017 | Rimmer | F23R 3/002 |
| 2017/0176005 | A1 * | 6/2017 | Rimmer | F02C 7/12 |
| 2017/0211811 | A1 * | 7/2017 | Wiebe | F23R 3/425 |
| 2017/0241643 | A1 * | 8/2017 | Mulcaire | F23R 3/002 |

(56) References Cited

U.S. PATENT DOCUMENTS

2017/0276356 A1* 9/2017 Mulcaire .................. F23R 3/002
2017/0356653 A1* 12/2017 Bagchi .................... F23R 3/002
2018/0038593 A1* 2/2018 Quach ...................... F02C 3/04

* cited by examiner

WALL PANEL ASSEMBLY FOR A GAS TURBINE ENGINE

BACKGROUND

Gas turbine engines contain structural elements that may be thermally protected. Coatings or liners may be applied as thermal protection. The liner may be a float wall liner that is supported in a floating manner to permit relative expansion and/or contraction of the float wall liner without incurring high stresses. The float wall liner may be provided with a coating that is subject to thermal mechanical fatigue cracking.

Accordingly, it is desirable to provide a float wall liner that is more robust to minimize thermal mechanical fatigue cracking of the coating.

BRIEF DESCRIPTION

According to an embodiment of the present disclosure, a wall panel assembly is provided. The wall panel assembly includes a first liner panel, a first coating, and a second coating. The first liner panel is operatively connected to an annular shell. The first liner panel has a first liner panel inner surface and a first liner panel outer surface. The first liner panel inner surface extends between a first liner panel first end and a first liner panel second end. The first liner panel outer surface is disposed opposite the first liner panel inner surface. The first liner panel outer surface extends between the first liner panel first end and the first liner panel second end. The first coating is disposed on at least one of the first liner panel inner surface and the first liner panel outer surface. The second coating is disposed on the first coating. A combination of the first coating and the second coating has a first overall thickness that is disposed proximate the first liner panel first end and a second overall thickness that is disposed proximate the first liner panel second end. The first thickness is different from the second thickness.

In addition to one or more of the features described above, or as an alternative to any of the foregoing embodiments, a second liner panel that is operatively connected to the annular shell. The second liner panel has a second liner panel inner surface extending between a second liner panel first end and a second liner panel second end. The second liner panel has a second liner panel outer surface disposed opposite the second liner panel inner surface and extends between the second liner panel first end and the second liner panel second end. The second liner panel second end axially overlaps the first liner panel first end.

In addition to one or more of the features described above, or as an alternative to any of the foregoing embodiments, the second liner panel second end is radially spaced apart from the first liner panel first end.

In addition to one or more of the features described above, or as an alternative to any of the foregoing embodiments, the first liner panel has a first liner panel first side that extends between the first liner panel first end and the first liner panel second end and a first liner panel second side that extends between the first liner panel first end and the first liner panel second end.

In addition to one or more of the features described above, or as an alternative to any of the foregoing embodiments, the first overall thickness varies circumferentially between the first liner panel first side and the first liner panel second side.

In addition to one or more of the features described above, or as an alternative to any of the foregoing embodiments, an overall thickness of a combination the first coating and the second coating varies axially between the first liner panel first side and the first liner panel second side.

According to an embodiment of the present disclosure, a wall panel assembly is provided. The wall panel assembly includes a first liner panel and a coating. The first liner panel has a first liner panel first end, a first liner panel second end disposed opposite the first liner panel first end, an inner first liner panel surface, and a first liner panel outer surface. The first liner panel inner surface and the first liner panel outer surface each axially extend between the first liner panel first end and the first liner panel second end. The coating is disposed on at least one of the first liner panel inner surface and the first liner panel outer surface. The coating has an overall thickness that varies axially between the first liner panel first end and the first liner panel second end.

In addition to one or more of the features described above, or as an alternative to any of the foregoing embodiments, a first coating disposed on the first liner panel inner surface and a second coating disposed on the first coating.

In addition to one or more of the features described above, or as an alternative to any of the foregoing embodiments, a second liner panel has a second liner panel first end, a second liner panel second end disposed opposite the second liner panel first end, a second liner panel inner surface, and a second liner panel outer surface. The second liner panel inner surface and the second liner panel outer surface each axially extend between the second liner panel first end and the second liner panel second end. The second liner panel second end abuts the first liner panel first end.

In addition to one or more of the features described above, or as an alternative to any of the foregoing embodiments, the overall thickness varies axially based on a ramp function.

In addition to one or more of the features described above, or as an alternative to any of the foregoing embodiments, the overall thickness varies axially based on a sinusoidal function.

According to an embodiment of the present disclosure, a gas turbine engine is provided. The gas turbine engine includes an annular shell and a wall panel assembly. The annular shell has an annular shell inner surface and an annular shell outer surface disposed opposite the annular shell inner surface. The wall panel assembly includes a first liner panel and a coating. The first liner panel is operatively connected to the annular shell. The first liner panel has a first liner panel inner surface and a first liner panel outer surface each extending between a first liner panel first end and a first liner panel second end. The coating is disposed on at least one of the first liner panel inner surface and the first liner panel outer surface. The coating has a first overall thickness that is disposed proximate the first liner panel first end and a second overall thickness that is disposed proximate the first liner panel second end. The first overall thickness being different from the second overall thickness.

In addition to one or more of the features described above, or as an alternative to any of the foregoing embodiments, an overall thickness of the coating varies between the first liner panel first end and the first liner panel second end according to a ramp function.

In addition to one or more of the features described above, or as an alternative to any of the foregoing embodiments, an overall thickness of the coating varies between the first liner panel first end and the first liner panel second end according to a sinusoidal function.

In addition to one or more of the features described above, or as an alternative to any of the foregoing embodiments, the first liner panel has a first liner panel first side and a first liner panel second side each extending between the first liner panel first end and the first liner panel second end.

In addition to one or more of the features described above, or as an alternative to any of the foregoing embodiments, the first overall thickness is constant in a direction that extends between the first liner panel first side and the first liner panel second side.

In addition to one or more of the features described above, or as an alternative to any of the foregoing embodiments, the second overall thickness is constant in a direction that extends between the first liner panel first side and the first liner panel second side.

In addition to one or more of the features described above, or as an alternative to any of the foregoing embodiments, a stud extends from the first liner panel outer surface through the annular shell inner surface to operatively connect the first liner panel to the annular shell.

In addition to one or more of the features described above, or as an alternative to any of the foregoing embodiments, a plurality of cooling pins that extend from the first liner panel outer surface towards the annular shell inner surface.

In addition to one or more of the features described above, or as an alternative to any of the foregoing embodiments, the annular shell defines at least one cooling hole that extends from the first liner panel outer surface towards the annular shell inner surface.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
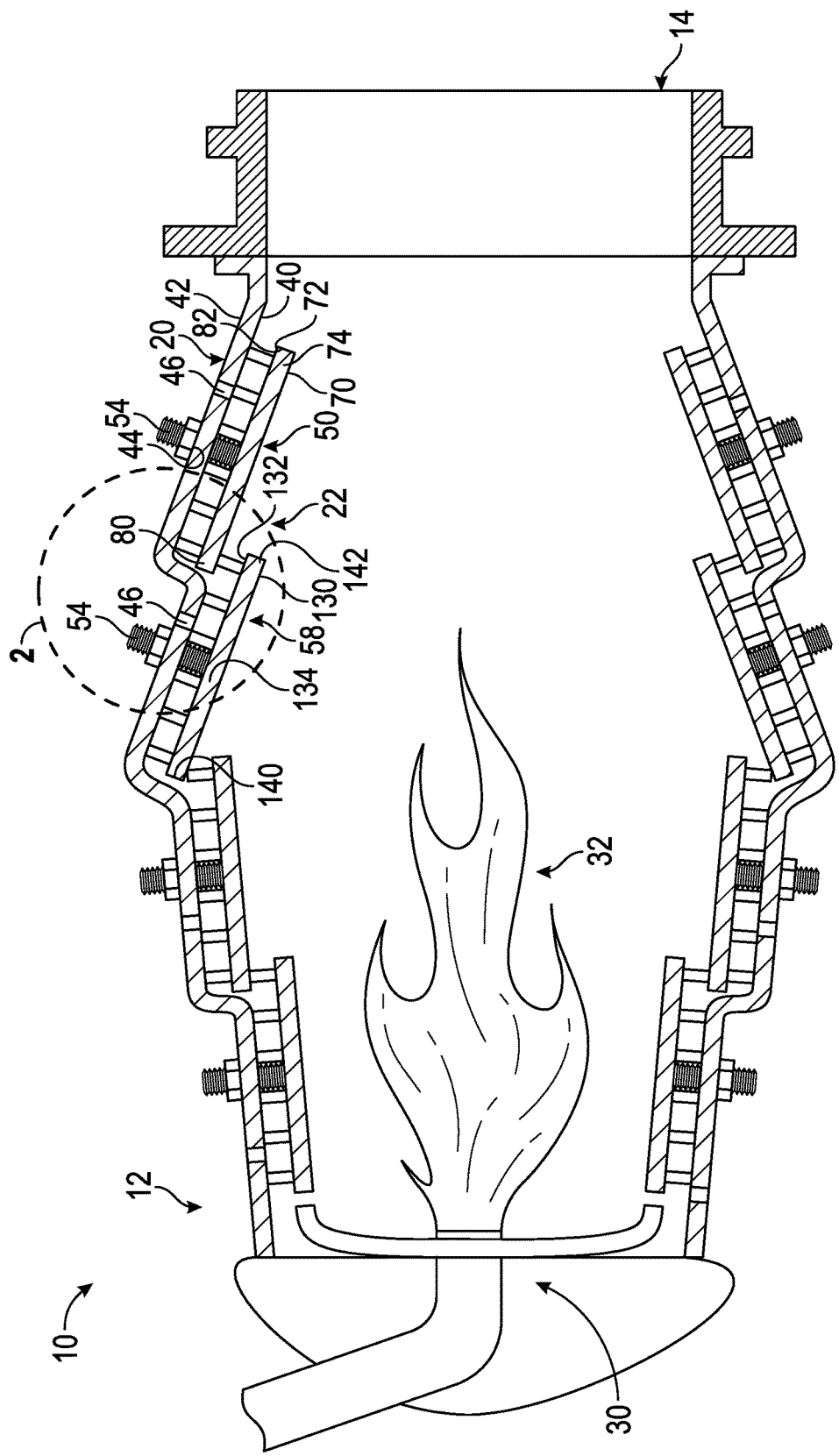
FIG. 1 is a partial sectional view of a combustor and a turbine section of a gas turbine engine.

Referring to FIG. 1, a partial sectional view of a portion of gas turbine engine 10 is shown. The portion of the gas turbine engine 10 includes at least a portion of a combustor section 12 and a vane 14 of the combustor section 12 or a turbine section that is disposed downstream of the combustor section 12.

The combustor section 12 includes an annular shell 20 and a wall panel assembly 22. The annular shell 20 extends axially and circumferentially between a fuel nozzle assembly 30 and the vane 14. The fuel nozzle assembly 30 is configured to mix and ignite compressed air that is delivered to the combustor section 12 with fuel to generate a flame and/or hot combustion gases 32 that are contained within the annular shell 20 and pass through the vane 14 and into the turbine section.

The annular shell 20 may be formed of the plurality of axially and/or circumferentially arranged shell sections that are contiguous or joined together. The annular shell 20 includes an annular shell inner surface 40 and an annular shell outer surface 42 that is disposed opposite the annular shell inner surface 40. The annular shell inner surface 40 and the outer annular shell surface 42 each extend axially and circumferentially between the fuel nozzle assembly 30 and the vane 14.

The annular shell 20 defines at least one mounting hole 44 and at least one cooling hole 46. The at least one mounting hole 44 extends from the annular shell outer surface 42 to the annular shell inner surface 40. The at least one cooling hole 46 is spaced apart from the at least one mounting hole 44. The at least one cooling hole 46 is disposed substantially parallel to the at least one mounting hole 44, as shown in FIGS. 1-4. In at least one embodiment, a plurality of cooling holes may be provided in the annular shell 20. The plurality of cooling holes are disposed about and are axially and circumferentially spaced apart from the at least one mounting hole 44.

The wall panel assembly 22 is operatively connected to the annular shell 20. The wall panel assembly 22 is configured to provide thermal protection for the annular shell 20 from the combustion gases that are contained within the annular shell 20. The wall panel assembly 22 includes a first liner panel 50, a grommet 52 (see FIGS. 5-7), a stud 54, a coating 56 (see FIGS. 5-8), and a second liner panel 58.

The first liner panel 50 includes a first liner panel inner surface 70, a first liner panel outer surface 72, a first liner panel first side 74, and a first liner panel second side 76. The first liner panel inner surface 70 is disposed opposite and is radially spaced apart from the first liner panel outer surface 72. The first liner panel inner surface 70 and the first liner panel outer surface 72 are each disposed substantially parallel to the annular shell inner surface 40. The first liner panel inner surface 70 and the first liner panel outer surface 72 each axially extend between a first liner panel first end 80 and a first liner panel second end 82 that is disposed opposite the first liner panel first end 80. The first liner panel inner surface 70 and the first liner panel outer surface 72 each circumferentially extend between the first liner panel first side 74 and the first liner panel second side 76.

Figure 2:
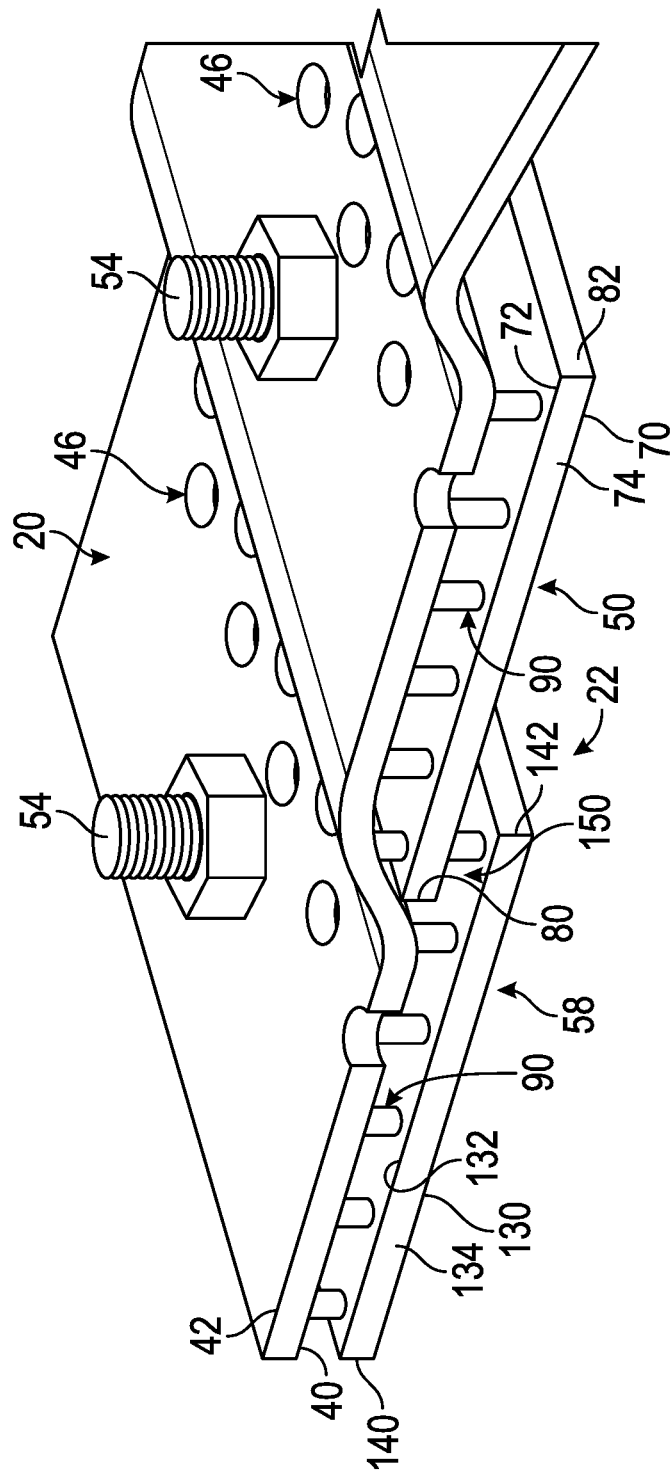
FIG. 2 is a partial sectional view of a shell and a wall panel assembly of the gas turbine engine.

Cooling air may enter through the at least one cooling hole 46 and impinge on the first liner panel outer surface 72. The cooling air may be fed from a region external to the combustor section 12 having a temperature less than the temperature of the combustion gases contained within the combustor section 12 to cool the first liner panel 50. Referring to FIGS. 1 and 2, a plurality of cooling pins 90 are disposed on the first liner panel outer surface 72. The plurality of cooling pins 90 extend from the first liner panel outer surface 72 towards the annular shell inner surface 40. The plurality of cooling pins 90 are configured to increase the surface area of the first liner panel 50 to improve heat transfer from the first liner panel 50. The plurality of cooling pins 90 are spaced apart from and do not engage the annular shell inner surface 40 by the grommet 52.

The grommet 52 is disposed on the first liner panel outer surface 72. The grommet 52 is configured to space the plurality of cooling pins 90 apart from the annular shell inner surface 40. The grommet 52 may engage the first liner panel outer surface 72 and the annular shell inner surface 40. The grommet 52 sets a spacing or distance between the first liner panel 50 and the first liner panel outer surface 72 and the annular shell inner surface 40.

The stud 54 is configured to operatively connect the first liner panel 50 to the annular shell 20. The stud 54 extends from the first liner panel outer surface 72 and is received in the at least one mounting hole 44 of the annular shell 20 such that the stud 54 extends completely through the annular shell inner surface 40 and the annular shell outer surface 42. The stud 54 may be a fastener, a pin, or the like that is secured to the annular shell by a nut or the like that is disposed on the annular shell outer surface 42.

Figure 3:
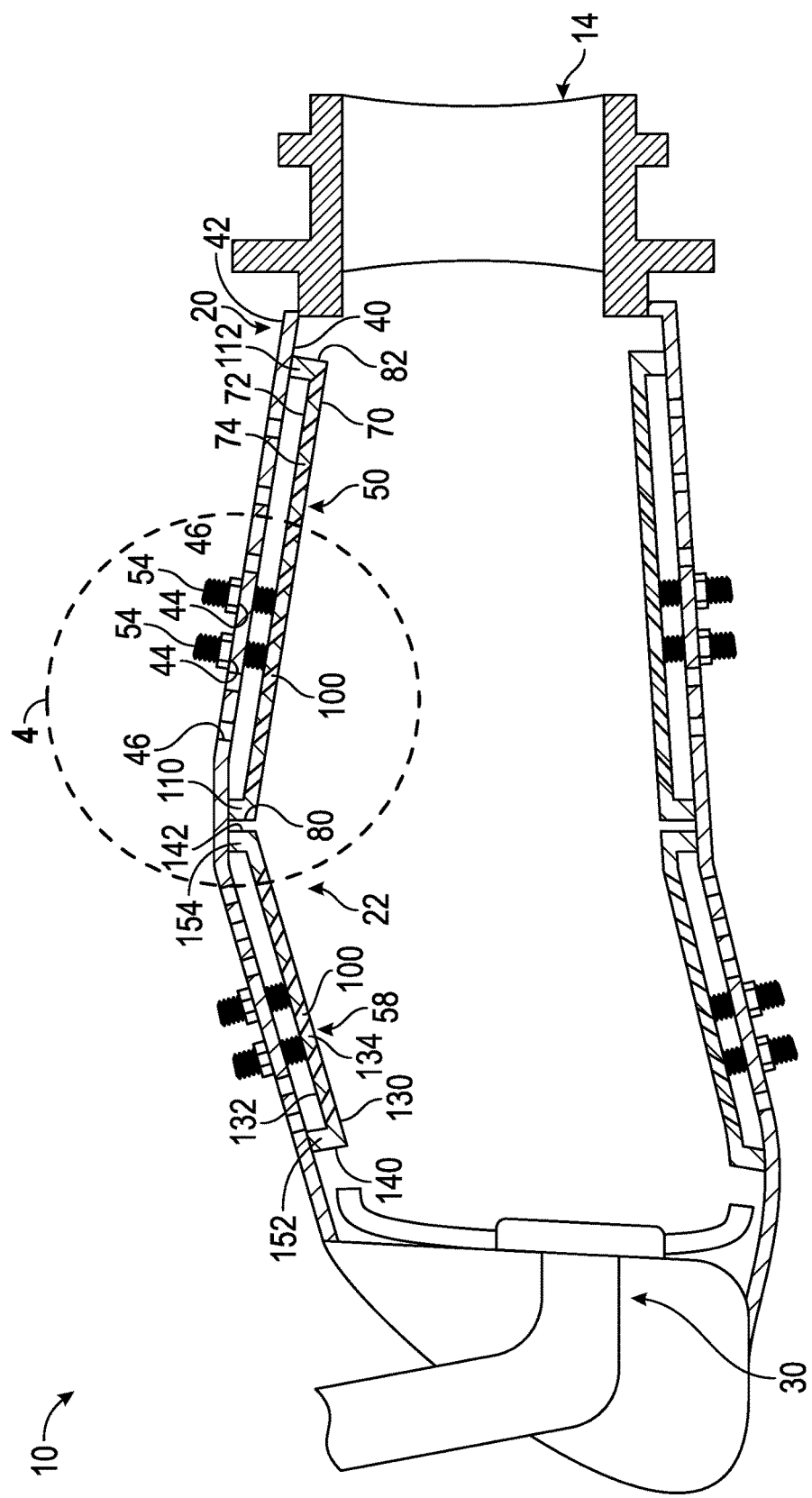
FIG. 3 is a partial sectional view of another configuration of the combustor and the turbine section of the gas turbine engine.
Figure 4:
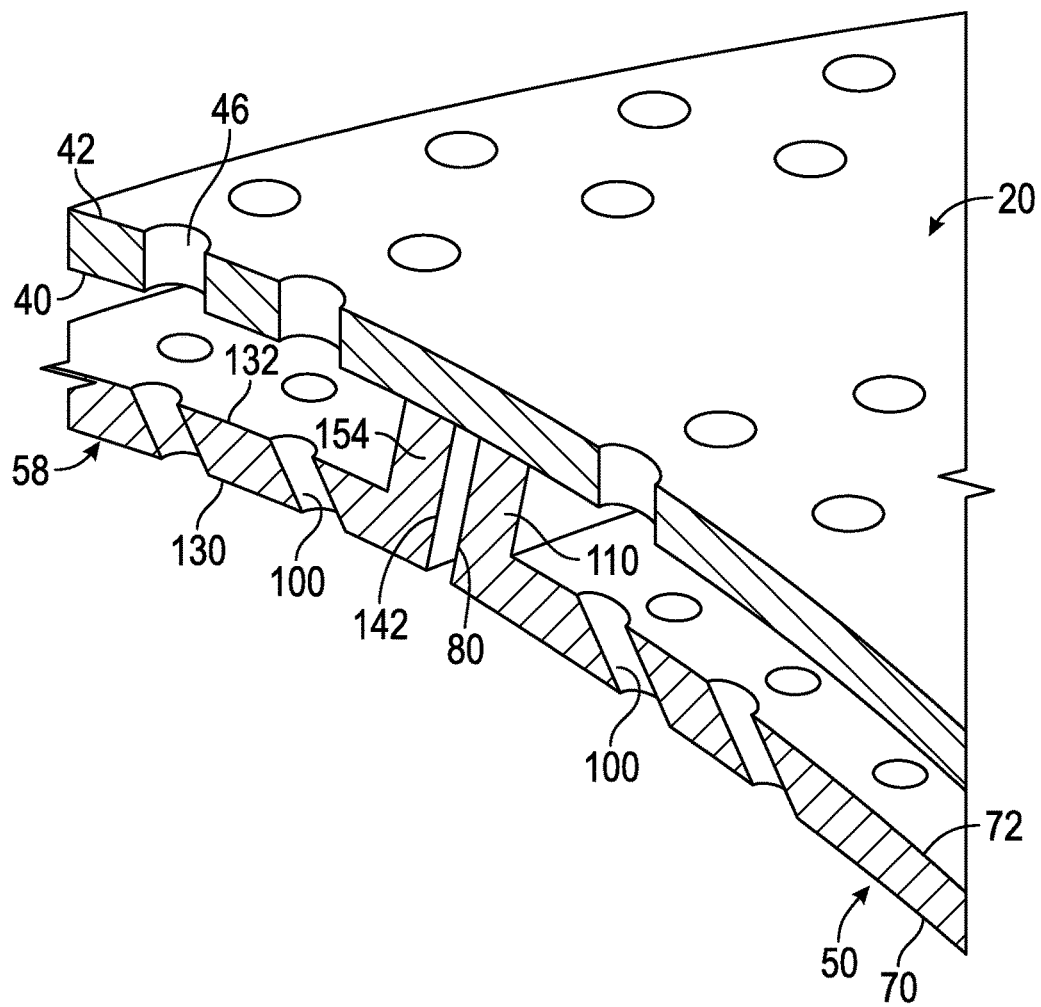
FIG. 4 is a partial sectional view of another configuration of the shell and the wall panel assembly of the gas turbine engine.

Referring to FIGS. 3 and 4, the first liner panel 50 is provided with a plurality of liner panel cooling holes 100. The plurality of liner panel cooling holes 100 extend from the first liner panel outer surface 72 towards the first liner panel inner surface 70. The plurality of liner panel cooling holes 100 are configured to receive the cooling air that enters through the at least one cooling hole 46 to aid in cooling the first liner panel 50. At least one liner panel cooling hole of the plurality of liner panel cooling holes 100 is proximately aligned with the at least one cooling hole 46 such that an outlet of the at least one cooling hole 46 directly flows into an inlet of at least one liner panel cooling hole of the plurality of liner panel cooling holes 100. The plurality of liner panel cooling holes 100 are disposed at an angle relative to the at least one cooling hole 46 of the annular shell 20. The plurality of liner panel cooling holes 100 are disposed in a non-parallel relationship relative to the at least one cooling hole 46 of the annular shell 20. The plurality of liner panel cooling holes 100 may be provided in conjunction with the plurality of cooling pins 90 or may be provided as an alternative to the plurality of cooling pins 90.

With continued reference to FIGS. 3 and 4, the first liner panel 50 includes a first arm 110 and a second arm 112. The first arm 110 is disposed proximate the first liner panel first end 80 and extends towards the annular shell inner surface 40. The first arm 110 is spaced apart from the annular shell inner surface 40. The second arm 112 is disposed proximate the first liner panel second end 82 and extends towards the annular shell inner surface 40. The second arm 112 is spaced apart from the annular shell inner surface 40. The grommet 52 may be provided and aids in spacing the first arm 110 and the second arm 112 from the shell inner surface 40.

Referring to FIGS. 5-8, the coating 56 is applied to the first liner panel 50. The coating 56 is disposed on the first liner panel inner surface 70 and/or the first liner panel outer surface 72. In at least one embodiment, the coating 56 may be applied to at least one of the first liner panel inner surface 70 and the first liner panel outer surface 72 such that at least one of the first liner panel inner surface 70 and the first liner panel outer surface 72 is coated by the coating 56 and the other of the at least one of the first liner panel inner surface 70 and the first liner panel outer surface 72 is uncoated or not coated by the coating 56. The coating 56 is a thermal barrier coating that is configured to provide thermal protection to the first liner panel 50. The combination of the coating 56 and the cooling air that enters through the at least one cooling hole 46 and impinges or flows through the first liner panel 50 controls the temperature of the first liner panel 50 and ultimately the annular shell 20. The constraining of the first liner panel 50 with the annular shell 20 by the stud 54 and temperature differences due to the cooling air that impinges or flows through the first liner panel 50 may result in high thermal stresses that may lead to thermal mechanical fatigue cracking of at least one of the coating 56 and the first liner panel 50. For example, the first liner panel first end 80 may be cooler as compared to the first liner panel second end 82 due to the cooling air provided through the at least one cooling hole 46 impinging closer to the first liner panel first end 80 than the first liner panel second end 82.

The coating 56 is applied to the first liner panel inner surface 70 and/or the first liner panel outer surface 72 such that it has a varying or variable overall thickness in at least one of the axial direction and the circumferential direction of the first liner panel 50 to control the temperature of the first liner panel 50.

The overall thickness of the coating 56 may be thinner proximate areas of the first liner panel 50 that are disposed proximate the at least one cooling hole 46 of the annular shell 20 and may be thicker proximate areas of the first liner panel 50 that are spaced apart from the at least one cooling hole 46 of the annular shell 20. Additionally, the overall thickness of the coating 56 may be thicker proximate areas of the first liner panel 50 that are disposed closer to the flame or hot combustion gases and may be thinner proximate areas of the first liner panel 50 that are disposed further from the flame or hot combustion gases.

The coating 56 may have a variable nominal overall thickness distribution to reduce thermal gradients and results in a more isothermal design of the first liner panel 50. Ultimately, the coating 56 having a variable nominal overall thickness distribution improves service life of the combustor section 12 and the overall gas turbine engine. The coating 56 may also reduce overhaul and repair costs for the gas turbine engine 10.

The coating 56 includes a first coating 120 and a second coating 122. The first coating 120 is disposed on at least one of the first liner panel inner surface 70 and the first liner panel outer surface 72. The first coating 120 may be a metallic bond coating to aid in bonding the second coating 122 to at least one of the first coating 120 and the first liner panel inner surface 70 and/or the first liner panel outer surface 72. The second coating 122 is disposed on the first coating 120 and may be an applied ceramic-based coating, a thermal barrier coating, a flame sprayed ceramic, or the like. A combination of the first coating 120 and the second coating 122 defines the overall thickness of the coating 56. The thickness of at least one of the first coating 120 and the second coating 122 may be varied axially and/or circumferentially over the first liner panel inner surface 70 and/or the first liner panel outer surface 72 to vary the overall thickness of the coating 56 axially and/or circumferentially over the first liner panel inner surface 70 and/or the first liner panel outer surface 72.

The coating 56 defines a first overall thickness, $t_1$, that is disposed proximate the first liner panel first end 80, a second overall thickness, $t_2$, that is disposed proximate the first liner panel second end 82, and an overall thickness, $t_0$, that extends or is disposed between the first liner panel first end 80 and the first liner panel second end 82. The first overall thickness, $t_1$, may be different from the second overall thickness, $t_2$.

Figure 8:
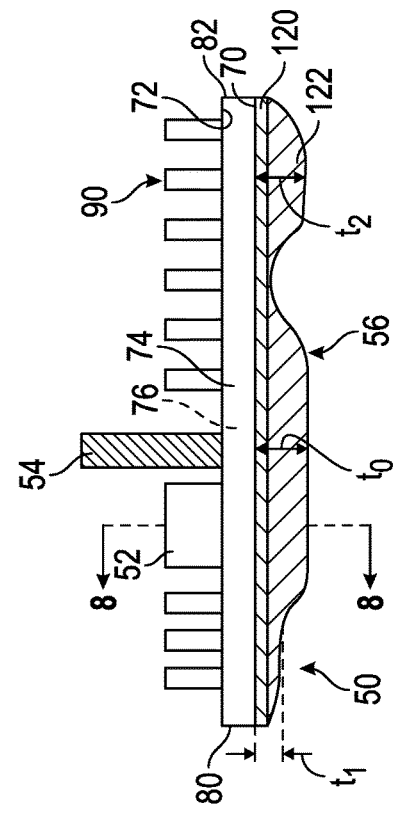
FIG. 8 is a partial circumferential sectional view of at least one of the first, second, and third configuration of the wall panel assembly.

The first overall thickness, $t_1$, may be substantially constant circumferentially in a direction that extends between the first liner panel first side 74 and the first liner panel second side 76. As shown in FIG. 8, the first overall thickness, $t_1$, may vary circumferentially in a direction that extends between the first liner panel first side 74 and the first liner panel second side 76.

The second overall thickness, t2, may be substantially constant circumferentially in a direction that extends between the first liner panel first side 74 and the first liner panel second side 76. As shown in FIG. 8, the second overall thickness, $t_2$, may vary circumferentially in a direction that extends between the first liner panel first side 74 and the first liner panel second side 76.

Figure 5:
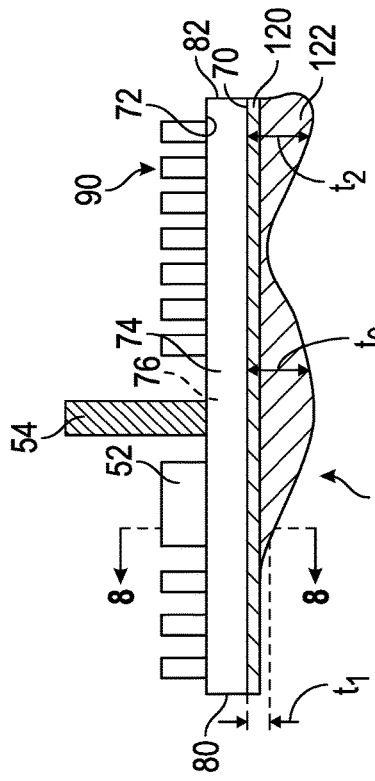
FIG. 5 is a partial axial sectional view of a first configuration of a wall panel assembly.

As shown in FIG. 5, the overall thickness, $t_O$, of the coating 56 varies between the first liner panel first end 80 and the first liner panel second end 82 according to a ramp function. The ramp function increases the overall thickness, $t_O$, of the coating 56 in the axial direction from the first liner panel first end 80 and the first liner panel second end 82 such that the second overall thickness, $t_2$, is greater than the first overall thickness, $t_1$. In at least one embodiment, the ramp function increases the overall thickness, $t_O$, of the coating 56 in the circumferential direction from the first liner panel first side 74 and the first liner panel second side 76.

Figure 6:
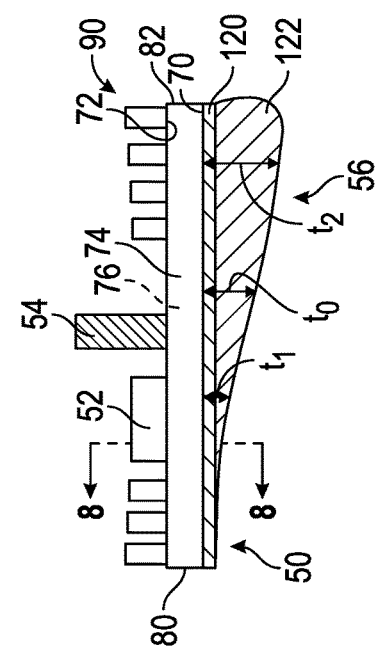
FIG. 6 is a partial axial sectional view of a second configuration of a wall panel assembly.

As shown in FIG. 6, the overall thickness, $t_O$, of the coating 56 varies between the first liner panel first end 80 and the first liner panel second end 82 according to a sinusoidal or pseudo-sinusoidal function. The sinusoidal or pseudo-sinusoidal function increases and decreases the overall thickness, $t_O$, of the coating 56 in the axial direction from the first liner panel first end 80 and the first liner panel second end 82 based on a sine or cosine between coating thickness and axial position. In at least one embodiment, the sinusoidal or pseudo-sinusoidal function increases and decreases the overall thickness, $t_O$, of the coating 56 in the circumferential direction from the first liner panel first side 74 and the first liner panel second side 76 based on a sine or cosine relationship between coating thickness and circumferential position.

Figure 7:
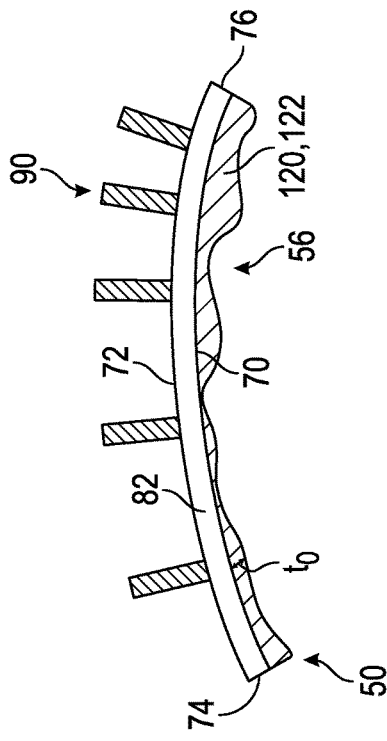
FIG. 7 is a partial axial sectional view of a third configuration of a wall panel assembly.

As shown in FIG. 7, the overall thickness, $t_O$, of the coating 56 varies between the first liner panel first end 80 and the first liner panel second end 82 according to an arbitrary or random function. The arbitrary or random function increases and/or decreases the overall thickness, $t_O$, of the coating 56 in the axial direction from the first liner panel first end 80 and the first liner panel second end 82. In at least one embodiment, the arbitrary or random function increases and/or decreases the overall thickness, $t_O$, of the coating 56 in the circumferential direction from the first liner panel first side 74 and the first liner panel second side 76.

Referring to FIGS. 1-4, the second liner panel 58 is operatively connected to the annular shell 20. The second liner panel 58 is disposed proximate the first liner panel 50. The second liner panel 58 includes a second liner panel inner surface 130, a second liner panel outer surface 132, a second liner panel first side 134, and a second liner panel second side 136. The second liner panel inner surface 130 is disposed opposite and is radially spaced apart from the second liner panel outer surface 132. The second liner panel inner surface 130 and the second liner panel outer surface 132 are each disposed substantially parallel to the annular shell inner surface 40. The second liner panel inner surface 130 and the second liner panel outer surface 132 each axially extend between a second liner panel first end 140 and a second liner panel second end 142 that is disposed opposite the second liner panel first end 140. The second liner panel inner surface 130 and the second liner panel outer surface 132 each circumferentially extend between the second liner panel first side 134 and the second liner panel second side 136. The second liner panel 58 has a substantially similar configuration to the first liner panel 50 and may also include the coating 56 that is disposed on the second liner panel inner surface 130.

As shown in FIGS. 1 and 2, the second liner panel second end 142 axially overlaps the first liner panel first end 80. The second liner panel second end 142 is radially spaced apart from the first liner panel first end 80 and defines a gap 150 therebetween. The cooling air that enters through the at least one cooling hole 46 may flow through the gap 150 and cool at least one of the second liner panel second end 142 and the first liner panel first end 80.

As shown in FIGS. 3 and 4, the second liner panel 58 includes a first arm 152 and a second arm 154. The first arm 152 is disposed proximate the second liner panel first end 140 and extends towards the annular shell inner surface 40. The first arm 152 is configured to engage the annular shell inner surface 40. The second arm 154 is disposed proximate the second liner panel second end 142 and extends towards the annular shell inner surface 40. The second arm 154 is configured to engage the annular shell inner surface 40. The second liner panel second end 142 abuts the first liner panel first end 80 such that the second arm 154 of the second liner panel 58 abuts the first arm 110 of the first liner panel 50.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A wall panel assembly, comprising:
   a first liner panel operatively connected to an annular shell, the first liner panel having a first liner panel inner surface extending between a first liner panel first end and a first liner panel second end and a first liner panel outer surface disposed opposite the first liner panel inner surface and extending between the first liner panel first end and the first liner panel second end, wherein the first liner panel has a first liner panel first side that extends between the first liner panel first end and the first liner panel second end and a first liner panel second side that extends between the first liner panel first end and the first liner panel second end;
   a first coating disposed on the first liner panel inner surface;

a second liner panel that is operatively connected to the annular shell, the second liner panel having a second liner panel inner surface extending between a second liner panel first end and a second liner panel second end and a second liner panel outer surface disposed opposite the second liner panel inner surface and extending between the second liner panel first end and the second liner panel second end, wherein the second liner panel second end axially overlaps the first liner panel first end and is radially spaced apart from the first liner panel first end; and a second coating disposed on the first coating, a combination of the first coating and the second coating having a first overall thickness disposed proximate the first liner panel first end and a second overall thickness disposed proximate the first liner panel second end, the first overall thickness being different from the second overall thickness; and wherein the first overall thickness varies circumferentially between the first liner and first side and the first liner panel second side.

2. The wall panel assembly of claim 1, wherein an overall thickness of a combination the first coating and the second coating varies axially between the first liner panel first end and the first liner panel second end.

3. A wall panel assembly, comprising:
a first liner panel having a first liner panel first end, a first liner panel second end disposed opposite the first liner panel first end, an inner first liner surface, a first liner panel first side, a first liner panel second side, and a first liner panel outer surface, the first liner panel inner surface and the first liner panel outer surface each axially extending between the first liner panel first end and the first liner panel second end and each of the first side and the second side axially extending between the first liner panel first end and the first liner panel second end;

a second liner panel that is operatively connected to an annular shell, the second liner panel having a second liner panel inner surface extending between a second liner panel first end and a second liner panel second end and a second liner panel outer surface disposed opposite the second liner panel inner surface and extending between the second liner panel first end and the second liner panel second end, wherein the second liner panel second end axially overlaps the first liner panel first end and is radially spaced apart from the first liner panel first end;

a coating disposed on the first liner panel inner surface and having an overall thickness that varies axially between the first liner panel first end and the first liner panel second end; and wherein the first overall thickness varies circumferentially between the first liner panel first side and the first liner panel second side.

4. The wall panel assembly of claim 3, wherein the coating includes:
a first coating disposed on the first liner panel inner surface; and
a second coating disposed on the first coating.

5. A gas turbine engine, comprising:
an annular shell having an annular shell inner surface and an annular shed outer surface disposed opposite the annular shell inner surface; and
a wall panel assembly, having:
a first liner panel operatively connected to the annular shell, the first liner panel having a first liner panel inner surface, a first liner panel outer surface, a first liner panel first side, and a first liner panel second side, each first liner panel surface and each first liner panel side extending between a first liner panel first end and a first liner panel second end;

a second liner panel operatively connected to the annular shell, the second liner panel having a second liner panel inner surface extending between a second liner panel first end and a second liner panel second end radially spaced from the first liner panel first end and a second liner panel outer surface disposed opposite the second liner panel inner surface and extending between the second liner panel first end and the second liner panel second end, wherein the second liner panel second end axially overlaps the first liner panel first end;

a coating disposed on the first liner panel inner surface, the coating having a first overall thickness disposed proximate the first liner panel first end and a second overall thickness disposed proximate the first liner panel second end, the first overall thickness being different from the second overall thickness and wherein the first overall thickness varies circumferentially between the first liner panel first side and the first liner panel second side.

6. The gas turbine engine of claim 5, wherein an overall thickness of the coating varies between the first liner panel first end and the first liner panel second end.

7. The gas turbine engine of claim 5, wherein the first liner panel has a first liner panel first side and a first liner panel second side each extending between the first liner panel first end and the first liner panel second end.

8. The gas turbine engine of claim 7, wherein the first overall thickness is constant in a direction that extends between the first liner panel first side and the first liner panel second side.

9. The gas turbine engine of claim 7, wherein the second overall thickness is constant in a direction that extends between the first liner panel first side and the first liner panel second side.

10. The gas turbine engine of claim 5, further comprising a stud that extends from the first liner panel outer surface through the annular shell inner surface to operatively connect the first liner panel to the annular shell.

11. The gas turbine engine of claim 10, further comprising a plurality of cooling pins that extend from the first liner panel outer surface towards the annular shell inner surface.

12. The gas turbine engine of claim 11, wherein the annular shell defines at least one cooling hole that extends from the first liner panel outer surface towards the annular shell inner surface.

* * * * *